United States Patent
Teng et al.

(10) Patent No.: US 12,192,442 B2
(45) Date of Patent: Jan. 7, 2025

(54) DEVICE AND METHOD FOR INTRA PREDICTIONS IN VIDEO CODING

(71) Applicant: SHARP KABUSHIKI KAISHA, Osaka (JP)

(72) Inventors: Chih-Yu Teng, Taipei (TW); Yu-Chiao Yang, Taipei (TW)

(73) Assignee: SHARP KABUSHIKI KAISHA, Osaka (JP)

( * ) Notice: Subject to any disclaimer, the term of this patent is extended or adjusted under 35 U.S.C. 154(b) by 101 days.

(21) Appl. No.: 17/943,804

(22) Filed: Sep. 13, 2022

(65) Prior Publication Data
US 2023/0090700 A1    Mar. 23, 2023

Related U.S. Application Data

(60) Provisional application No. 63/243,580, filed on Sep. 13, 2021.

(51) Int. Cl.
*H04N 19/136* (2014.01)
*H04N 19/105* (2014.01)
*H04N 19/159* (2014.01)
*H04N 19/176* (2014.01)
*H04N 19/46* (2014.01)

(52) U.S. Cl.
CPC ......... *H04N 19/105* (2014.11); *H04N 19/136* (2014.11); *H04N 19/159* (2014.11); *H04N 19/176* (2014.11); *H04N 19/46* (2014.11)

(58) Field of Classification Search
CPC .. H04N 19/105; H04N 19/136; H04N 19/159; H04N 19/176; H04N 19/46
See application file for complete search history.

(56) References Cited

U.S. PATENT DOCUMENTS

| | | | | |
|---|---|---|---|---|
| 2017/0353719 | A1* | 12/2017 | Liu | H04N 19/156 |
| 2019/0166370 | A1* | 5/2019 | Xiu | H04N 19/11 |
| 2023/0319265 | A1* | 10/2023 | Wang | H04N 19/11 |
| | | | | 375/240.12 |

FOREIGN PATENT DOCUMENTS

| | | | |
|---|---|---|---|
| WO | 2020197152 A1 | 10/2020 | |
| WO | WO-2023015163 A1 * | 2/2023 | H04N 19/105 |

OTHER PUBLICATIONS

Mohsen Abdoli et al., "Non-CE3: Decoder-side Intra Mode Derivation with Prediction Fusion", Joint Video Experts Team (JVET) of ITU-T SG 16 WP 3 and ISO/IEC JTC 1/SC 29/WG 11 14th Meeting: Geneva, CH, Mar. 19-29, 2019, JVET-N0342, Section 3.1-3.2.

* cited by examiner

*Primary Examiner* — Dave Czekaj
*Assistant Examiner* — Berteau Joisil
(74) *Attorney, Agent, or Firm* — ScienBiziP, P.C.

(57) ABSTRACT

A method of decoding video data is provided. The method includes: receiving the video data; determining, from an image frame of the video data, a block unit; determining a first intra prediction of the block unit based on a decoder-side intra mode derivation (DIMD) mode; determining a second intra prediction of the block unit based on an intra prediction mode other than the DIMD mode; generating a third intra prediction based on the first intra prediction and the second intra prediction; and reconstructing the block unit based on the third intra prediction. In addition, an electronic device using the method is also provided.

18 Claims, 12 Drawing Sheets

DEVICE AND METHOD FOR INTRA PREDICTIONS IN VIDEO CODING

CROSS-REFERENCE TO RELATED APPLICATION(S)

The present disclosure claims the benefit of and priority to U.S. Provisional Patent Application Ser. No. 63/243,580, filed on Sep. 13, 2021, entitled "PROPOSED MODIFICATIONS ON DIMD AND TIMD". The contents of the above-mentioned application are hereby incorporated fully by reference into the present disclosure.

FIELD

The present disclosure is generally related to video coding, and more specifically, to techniques of intra predictions.

BACKGROUND

One fundamental component of video compression is intra prediction. Intra prediction takes advantage of redundancy in the information of neighboring pixel values within video frames to predict blocks of pixels from their surrounding pixels and thus allowing the transmission of the prediction errors instead of the pixel values themselves. The values of the prediction errors are of smaller values than the values of the pixels themselves, thus facilitating compression of the video stream.

Various intra prediction "modes" may be used to perform intra prediction, such as a planar mode, a linear model mode, a direct current (DC) mode, or an angular mode, etc. In general, at least one mode index is needed for indicating the mode adopted for performing the intra prediction.

Despite of lots of intra prediction modes have been introduced, how to provide a new intra prediction mode or method to achieve an improving coding efficiency is still a strived goal of those skilled in the art.

SUMMARY

The present disclosure is directed to a device and method for performing intra prediction.

In a first aspect of the present disclosure, a method of decoding video data is provided. The method includes receiving the video data; determining a block unit from an image frame of the video data; determining a first intra prediction of the block unit based on a decoder-side intra mode derivation (DIMD) mode; determining a second intra prediction of the block unit based on an intra prediction mode other than the DIMD mode; generating a third intra prediction based on the first intra prediction and the second intra prediction; and reconstructing the block unit based on the third intra prediction.

In an implementation of the first aspect, the intra prediction mode other than the DIMD mode includes at least one of a planar mode, a linear model mode, a direct current (DC) mode, or an angular mode different from the DIMD mode.

In another implementation of the first aspect, the second intra prediction is determined based on a template-based intra mode derivation (TIMD) mode, and determining the second intra prediction of the block unit based on the TIMD mode includes determining a template region associated with the block unit; calculating a plurality of template costs for a plurality of candidate modes a the candidate list respectively based on the template region; selecting a first candidate mode of the plurality of candidate modes corresponding to a minimum template cost and a second candidate mode of the plurality of candidate modes corresponding to a second minimum template cost; and determining the second intra prediction based on the first candidate mode and the second candidate mode. The template region includes a first reconstructed block left-neighboring the block unit and a second reconstructed block upper-neighboring the block unit.

In another implementation of the first aspect, calculating the plurality of template costs for the plurality of candidate modes of the candidate list respectively based on the template region includes generating a plurality of predictions of the template region based on a plurality of reference samples of the template region, the plurality of predictions corresponding to the plurality of candidate modes of the candidate list; and calculating a plurality of template costs for the plurality of predictions based on a template reconstruction of the template region.

In another implementation of the first aspect, determining the second intra prediction based on the first candidate mode and the second candidate mode includes determining whether the second minimum template cost is less than twice the minimum template cost; in a case that the second minimum template cost is less than twice the minimum template cost, determining the second intra prediction based on the first candidate mode; and in a case that the second minimum template cost is not less than twice the minimum template cost, determining the second intra prediction based on the first candidate mode, the second candidate mode, the minimum template cost, and the second minimum template cost.

In another implementation of the first aspect, determining the first intra prediction of the block unit based on the DIMD mode includes generating a histogram of gradient (HoG) list based on a template region of the block unit, the HoG list including a plurality of angular modes associated with the block unit; and selecting at least one of the plurality of angular modes for determining the first intra prediction. The template region of the block unit includes a first reconstructed region adjacent to a left side of the block unit, a second reconstructed region adjacent to an upper side of the block unit, and a third reconstructed region joining the first reconstructed region and the second reconstructed region.

In another implementations of the first aspect, generating the HoG list based on the template region of the block unit includes calculating a plurality of template angles and a plurality of template amplitudes corresponding to the plurality of template angles by applying a filter on each of a plurality of positions in the template region. Each of the plurality of template angles corresponds to one of the plurality of angular modes. The plurality of template costs for the plurality of predictions correspond to the plurality of template costs for the plurality of candidate modes of the candidate list.

In another implementation of the first aspect, the at least one of the plurality of angular modes corresponds to at least one largest template amplitude within the plurality of template amplitudes.

In another implementation of the first aspect, generating the third intra prediction based on the first intra prediction and the second intra prediction includes determining a first weight corresponding to the first intra prediction and a second weight corresponding to the second intra prediction; and determining the third intra prediction by calculating a weighted average of the first intra prediction and the second intra prediction based on the first weight and the second weight.

In another implementation of the first aspect, the method further includes the step of decoding a specific flag in the video data. The specific flag indicates whether to use the third intra prediction for reconstructing the block unit.

In a second aspect of the present disclosure, an electronic device for decoding video data is provided. The electronic device includes at least one processor and at least one storage device coupled to the at least one processor. The storage device stores a plurality of instructions which, when executed by the at least one processor, cause the electronic device to: receive the video data; determine a block unit from an image frame according to the video data; determine a first intra prediction of the block unit based on a DIMD mode; determine a second intra prediction of the block unit based on an intra prediction mode other than the DIMD mode; generate a third intra prediction based on the first intra prediction and the second intra prediction; and reconstruct the block unit based on the third intra prediction.

BRIEF DESCRIPTION OF THE DRAWINGS

Aspects of the present disclosure are best understood from the following detailed disclosure and the corresponding figures. Various features are not drawn to scale and dimensions of various features may be arbitrarily increased or reduced for clarity of discussion.

DESCRIPTION

Figure 1:
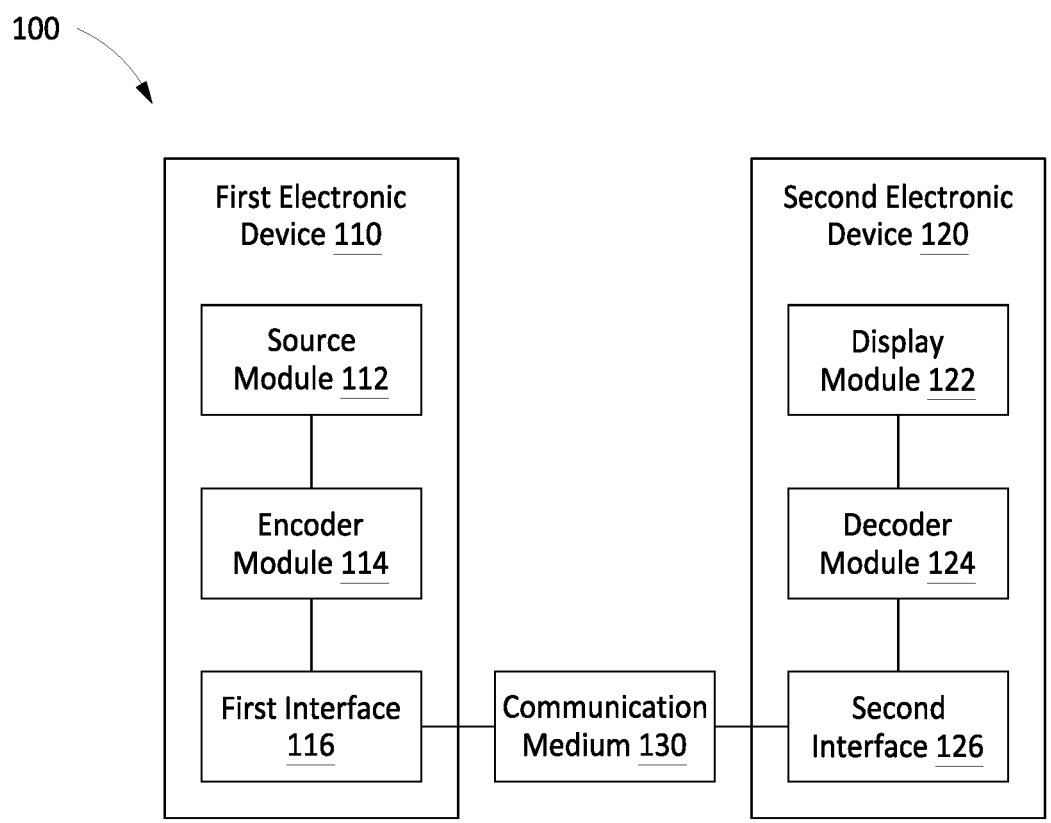
FIG. 1 illustrates a block diagram of a system configured to encode and decode video data according to an implementation of the present disclosure.

The following disclosure contains specific information pertaining to implementations in the present disclosure. The figures and the corresponding detailed disclosure are directed to example implementations. However, the present disclosure is not limited to these example implementations. Other variations and implementations of the present disclosure will occur to those skilled in the art.

Unless noted otherwise, like or corresponding elements among the figures may be indicated by like or corresponding reference designators. The figures and illustrations in the present disclosure are generally not to scale and are not intended to correspond to actual relative dimensions.

For the purposes of consistency and ease of understanding, like features are identified (although, in some examples, not illustrated) by reference designators in the exemplary figures. However, the features in different implementations may differ in other respects and shall not be narrowly confined to what is illustrated in the figures.

The disclosure uses the phrases "in one implementation," or "in some implementations," which may refer to one or more of the same or different implementations. The term "coupled" is defined as connected, whether directly or indirectly, through intervening components and is not necessarily limited to physical connections. The term "comprising" means "including, but not necessarily limited to" and specifically indicates open-ended inclusion or membership in the so-described combination, group, series and the equivalent.

For purposes of explanation and non-limitation, specific details, such as functional entities, techniques, protocols, and standards are set forth for providing an understanding of the disclosed technology. Detailed disclosure of well-known methods, technologies, systems, and architectures are omitted so as not to obscure the present disclosure with unnecessary details.

Persons skilled in the art will recognize that any disclosed coding function(s) or algorithm(s) described in the present disclosure may be implemented by hardware, software, or a combination of software and hardware. Disclosed functions may correspond to modules that are software, hardware, firmware, or any combination thereof.

A software implementation may include a program having computer-executable instructions stored on a computer-readable medium such as memory or other type of storage devices. For example, one or more microprocessors or general-purpose computers with communication processing capability may be programmed with executable instructions and perform the disclosed function(s) or algorithm(s).

The microprocessors or general-purpose computers may be formed of application-specific integrated circuits (ASICs), programmable logic arrays, and/or using one or more digital signal processors (DSPs). Although some of the disclosed implementations are oriented to software installed and executing on computer hardware, alternative implementations implemented as firmware, or as hardware, or as a combination of hardware and software are well within the scope of the present disclosure. The computer-readable medium includes but is not limited to random-access memory (RAM), read-only memory (ROM), erasable programmable read-only memory (EPROM), electrically erasable programmable read-only memory (EEPROM), flash memory, compact disc read-only memory (CD ROM), magnetic cassettes, magnetic tape, magnetic disk storage, or any other equivalent medium capable of storing computer-readable instructions.

FIG. 1 illustrates a block diagram of a system 100 configured to encode and decode video data according to an implementation of the present disclosure. The system 100 includes a first electronic device 110, a second electronic device 120, and a communication medium 130.

The first electronic device 110 may be a source device including any device configured to encode video data and transmit encoded video data to the communication medium 130. The second electronic device 120 may be a destination device including any device configured to receive encoded video data via the communication medium 130 and decode encoded video data.

The first electronic device 110 may communicate via wire or wirelessly with the second electronic device 120 via the communication medium 130. The first electronic device 110 may include a source module 112, an encoder module 114, and a first interface 116. The second electronic device 120 may include a display module 122, a decoder module 124, and a second interface 126. The first electronic device 110 may be a video encoder and the second electronic device 120 may be a video decoder.

The first electronic device 110 and/or the second electronic device 120 may be a mobile phone, a tablet, a desktop, a notebook, or other electronic device. FIG. 1 illustrates one example of the first electronic device 110 and the second electronic device 120. The first electronic device 110 and second electronic device 120 may include greater or fewer components than illustrated or have a different configuration of the various illustrated components.

The source module 112 may include a video capture device to capture new video, a video archive to store previously captured video, and/or a video feed interface to receive video from a video content provider. The source module 112 may generate computer graphics-based data as the source video or generate a combination of live video, archived video, and computer-generated video as the source video. The video capture device may be a charge-coupled device (CCD) image sensor, a complementary metal-oxide-semiconductor (CMOS) image sensor, or a camera.

The encoder module 114 and the decoder module 124 may each be implemented as any of a variety of suitable encoder/decoder circuitry such as one or more microprocessors, a central processing unit (CPU), a graphics processing unit (GPU), a system-on-a-chip (SoC), digital signal processors (DSPs), application-specific integrated circuits (ASICs), field-programmable gate arrays (FPGAs), discrete logic, software, hardware, firmware, or any combination thereof. When implemented partially in software, a device may store the program having instructions for the software in a suitable, non-transitory computer-readable medium and execute the instructions in hardware using one or more processors to perform the disclosed methods. Each of the encoder module 114 and the decoder module 124 may be included in one or more encoders or decoders, any of which may be integrated as part of a combined encoder/decoder (CODEC) in a device.

The first interface 116 and the second interface 126 may utilize customized protocols or follow existing standards or de facto standards including, but not limited to, Ethernet, IEEE 802.11 or IEEE 802.15 series, Wireless USB or telecommunication standards including, but not limited to, Global System for Mobile Communications (GSM), Code-Division Multiple Access 2000 (CDMA2000), Time Division Synchronous Code Division Multiple Access (TD-SCDMA), Worldwide Interoperability for Microwave Access (WiMAX), Third Generation Partnership Project Long-Term Evolution (3GPP-LTE) or Time-Division LTE (TD-LTE). The first interface 116 and the second interface 126 may each include any device configured to transmit and/or store a compliant video bitstream via the communication medium 130 and to receive the compliant video bitstream via the communication medium 130.

The first interface 116 and the second interface 126 may include a computer system interface that enables a compliant video bitstream to be stored on a storage device or to be received from the storage device. For example, the first interface 116 and the second interface 126 may include a chipset supporting Peripheral Component Interconnect (PCI) and Peripheral Component Interconnect Express (PCIe) bus protocols, proprietary bus protocols, Universal Serial Bus (USB) protocols, Inter-Integrated Circuit (I2C) protocols, or any other logical and physical structure that may be used to interconnect peer devices.

The display module 122 may include a display using liquid crystal display (LCD) technology, plasma display technology, organic light-emitting diode (OLED) display technology, or light-emitting polymer display (LPD) technology, with other display technologies used in other implementations. The display module 122 may include a high-definition display or an ultra-high-definition display.

Figure 2:
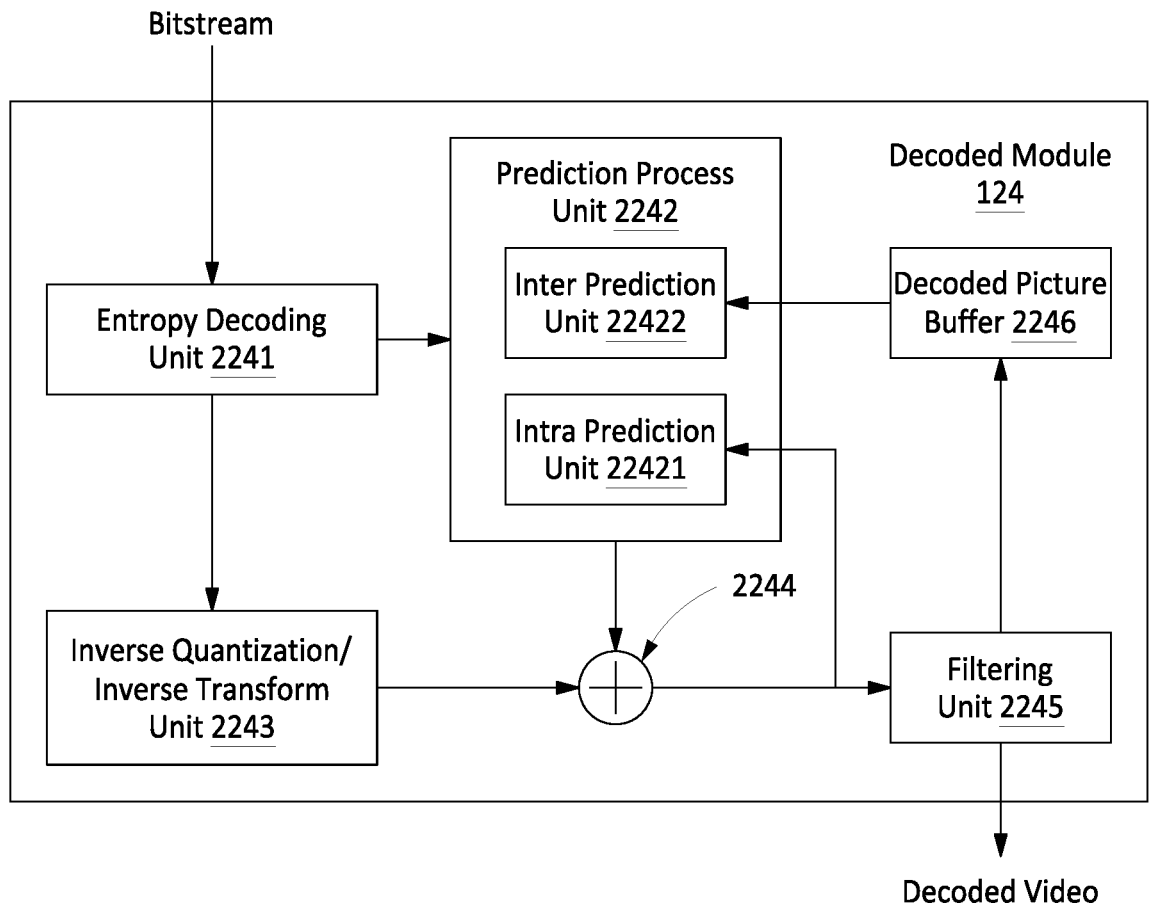
FIG. 2 illustrates a block diagram of a decoder module of a second electronic device illustrated in FIG. 1 according to an implementation of the present disclosure.

FIG. 2 illustrates a block diagram of the decoder module 124 of the second electronic device 120 illustrated in FIG. 1 according to an implementation of the present disclosure. The decoder module 124 includes an entropy decoder (e.g., entropy decoding unit 2241), a prediction processor (e.g., prediction process unit 2242), an inverse quantization/inverse transform processor (e.g., inverse quantization/inverse transform unit 2243), a summer (e.g., summer 2244), a filter (e.g., filtering unit 2245), and a decoded picture buffer (e.g., decoded picture buffer 2246). The prediction process unit 2242 further includes an intra prediction processor (e.g., intra prediction unit 22421) and an inter prediction processor (e.g., inter prediction unit 22422). The decoder module 124 receives a bitstream and decodes the bitstream to output decoded video.

The entropy decoding unit 2241 may receive the bitstream including a plurality of syntax elements from the second interface 126 in FIG. 1 and perform a parsing operation on the bitstream to extract syntax elements from the bitstream. As part of the parsing operation, the entropy decoding unit 2241 may entropy decode the bitstream to generate quantized transform coefficients, quantization parameters, transform data, motion vectors, intra modes, partition information, and other syntax information.

The entropy decoding unit 2241 may perform context adaptive variable length coding (CAVLC), context adaptive binary arithmetic coding (CABAC), syntax-based context-adaptive binary arithmetic coding (SBAC), probability interval partitioning entropy (PIPE) coding, or another entropy coding technique to generate the quantized transform coefficients. The entropy decoding unit 2241 may provide the quantized transform coefficients, the quantization parameters, and the transform data to the inverse quantization/inverse transform unit 2243 and provide the motion vectors, the intra modes, the partition information, and other syntax information, such as syntax elements for control of tool (e.g., prediction tool) enablement, to the prediction process unit 2242.

The prediction process unit 2242 may receive syntax elements such as motion vectors, intra prediction modes, partition information, and other syntax information from the entropy decoding unit 2241. The prediction process unit 2242 may receive the syntax elements including the partition information and divide image frames according to the partition information.

Each of the image frames may be divided into at least one image block according to the partition information. The at least one image block may include a luminance block for reconstructing a plurality of luminance samples and at least one chrominance block for reconstructing a plurality of chrominance samples. The luminance block and the at least one chrominance block may be further divided to generate macroblocks, coding tree units (CTUs), coding blocks (CBs), sub-divisions thereof, and/or another equivalent coding unit.

In some implementations, during the decoding process, the prediction process unit 2242 may receive predicted data including the intra prediction mode or the motion vector for a current image block of a specific one of the image frames. The current image block may be the luminance block or one of the chrominance blocks in the specific image frame.

In some implementations, during the decoding process, the syntax elements may not include the intra prediction mode for the current image block. Instead, the intra prediction mode for the current image block may be derived by the prediction process unit 2242 itself based on, for example, reconstructed samples neighboring to the current image block, details of which will be described below with exemplary implementations.

The intra prediction unit 22421 may perform intra-predictive coding of a current block unit relative to one or more neighboring blocks in the same frame as the current block unit based on at least one intra prediction mode in order to generate a predicted block. The intra prediction mode may, for example, specify the location of reference samples selected from the neighboring blocks within the current frame. The intra prediction unit 22421 may reconstruct a plurality of chroma components of the current block unit based on a plurality of luma components of the current block unit when the chroma components are reconstructed by the prediction process unit 2242.

The intra prediction unit 22421 may reconstruct a plurality of chroma components of the current block unit based on the plurality of luma components of the current block unit when the luma components of the current block are reconstructed by the prediction process unit 2242.

The inter prediction unit 22422 may perform inter-predictive coding of the current block unit relative to one or more blocks in one or more reference image blocks based on syntax elements related to the motion vector in order to generate the predicted block. The motion vector may indicate a displacement of the current block unit within the current image block relative to a reference block unit within the reference image block. The reference block unit is a block determined to closely match the current block unit. The inter prediction unit 22422 may receive the reference image block stored in the decoded picture buffer 2246 and reconstruct the current block unit based on the received reference image blocks.

The inverse quantization/inverse transform unit 2243 may apply inverse quantization and inverse transformation to reconstruct the residual block in the pixel domain. The inverse quantization/inverse transform unit 2243 may apply inverse quantization to the residual quantized transform coefficient to generate a residual transform coefficient and then apply inverse transformation to the residual transform coefficient to generate the residual block in the pixel domain.

The inverse transformation may be inversely applied by the transformation process such as discrete cosine transform (DCT), discrete sine transform (DST), adaptive multiple transform (AMT), mode-dependent non-separable secondary transform (MDNSST), Hypercube-Givens transform (HyGT), signal dependent transform, Karhunen-Loéve transform (KLT), wavelet transform, integer transform, sub-band transform, or a conceptually similar transform. The inverse transformation may convert the residual information from a transform domain, such as a frequency domain, back to the pixel domain. The degree of inverse quantization may be modified by adjusting a quantization parameter.

The summer 2244 adds the reconstructed residual block to the predicted block provided from the prediction process unit 2242 to produce a reconstructed block.

The filtering unit 2245 may include a deblocking filter, a sample adaptive offset (SAO) filter, a bilateral filter, and/or an adaptive loop filter (ALF) to remove blocking artifacts from the reconstructed block. Additional filters (in loop or post loop) may also be used in addition to the deblocking filter, the SAO filter, the bilateral filter, and the ALF. Such filters are not explicitly illustrated for brevity but may filter the output of the summer 2244. The filtering unit 2245 may output the decoded video to the display module 122 or other video receiving unit after the filtering unit 2245 performs the filtering process for the reconstructed blocks of the specific image frame.

The decoded picture buffer 2246 may be a reference picture memory that stores the reference block for use by the prediction process unit 2242 in decoding the bitstream (in inter coding modes). The decoded picture buffer 2246 may be formed by any of a variety of memory devices, such as dynamic random-access memory (DRAM), including synchronous DRAM (SDRAM), magneto-resistive RAM (MRAM), resistive RAM (RRAM), or other types of memory devices. The decoded picture buffer 2246 may be on-chip with other components of the decoder module 124 or off-chip relative to those components.

Figure 3:
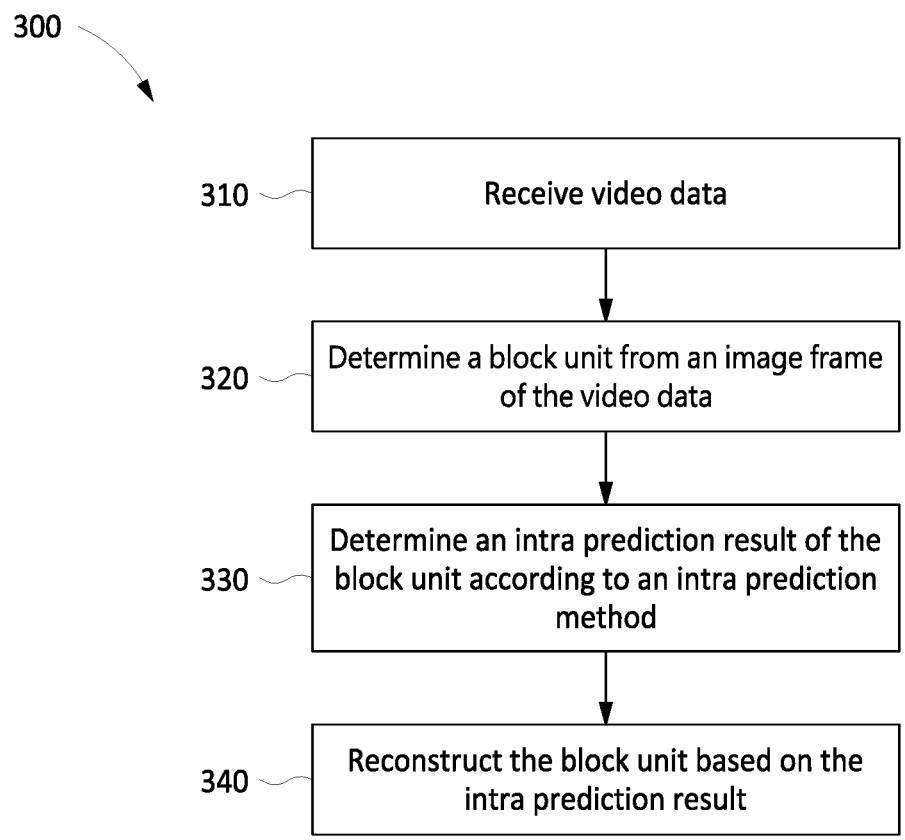
FIG. 3 illustrates a flowchart of a method for decoding video data by an electronic device according to an implementation of the present disclosure.

FIG. 3 illustrates a flowchart of a method for decoding video data by an electronic device according to an implementation of the present disclosure. The method 300 is an example only, as there are a variety of ways to perform decoding of the video data.

The method 300 may be performed using the configurations illustrated in FIG. 1 and FIG. 2, and various elements of these figures are referenced with regard to the method 300. Each block illustrated in FIG. 3 may represent one or more processes, methods, or subroutines performed.

The order of blocks in FIG. 3 is illustrative only and may change. Additional blocks may be added, or fewer blocks may be utilized without departing from the present disclosure.

At block 310, the decoder module 124 receives video data. The video data received by the decoder module 124 may be a bitstream.

With reference to FIG. 1 and FIG. 2, the second electronic device 120 may receive the bitstream from an encoder, such as the first electronic device 110, or other video providers via the second interface 126. The second interface 126 may provide the bitstream to the decoder module 124.

The entropy decoding unit 2241 may decode the bitstream to determine a plurality of prediction indications and a plurality of partitioning indications for a plurality of image frames. Then, the decoder module 124 may further reconstruct the plurality of image frames based on the prediction indications and the partitioning indications. The prediction indications and the partitioning indications may include a plurality of flags and a plurality of indices.

At block 320, the decoder module 124 determines a block unit from an image frame of the video data.

With reference to FIG. 1 and FIG. 2, the decoder module 124 may determine the image frame based on the bitstream and divide the image frame to determine the block unit according to the partition indications in the bitstream. For example, the decoder module 124 may divide the image frames to generate a plurality of CTUs, and further divide one of the CTUs to determine the block unit according to the partition indications based on any video coding standard.

Continuing with FIG. 3, at block 330, the decoder module 124 may determine an intra prediction result of the block unit according to an intra prediction method; at block 340, the decoder module 124 may reconstruct the block unit based on the intra prediction result. It should be noted that once the intra prediction result is obtained, one of ordinary skill in the art should be familiar with how to reconstruct the block unit based on the intra prediction result. Therefore, details of such reconstruction will not be described and delimited in the present disclosure.

In the present disclosure, several intra prediction methods using intra prediction modes derived by the decoder module 124 (e.g., the prediction process unit 2242) are described.

Decoder-Side Intra Mode Derivation (DIMD) Method

In some implementations, the intra prediction methods may include a DIMD method. Specifically, the DIMD method may be used for performing the intra prediction so as to obtain the intra prediction result. In the present disclosure, performing an intra prediction based on the DIMD method may be referred to as performing the intra prediction based on a DIMD mode.

Figure 4:
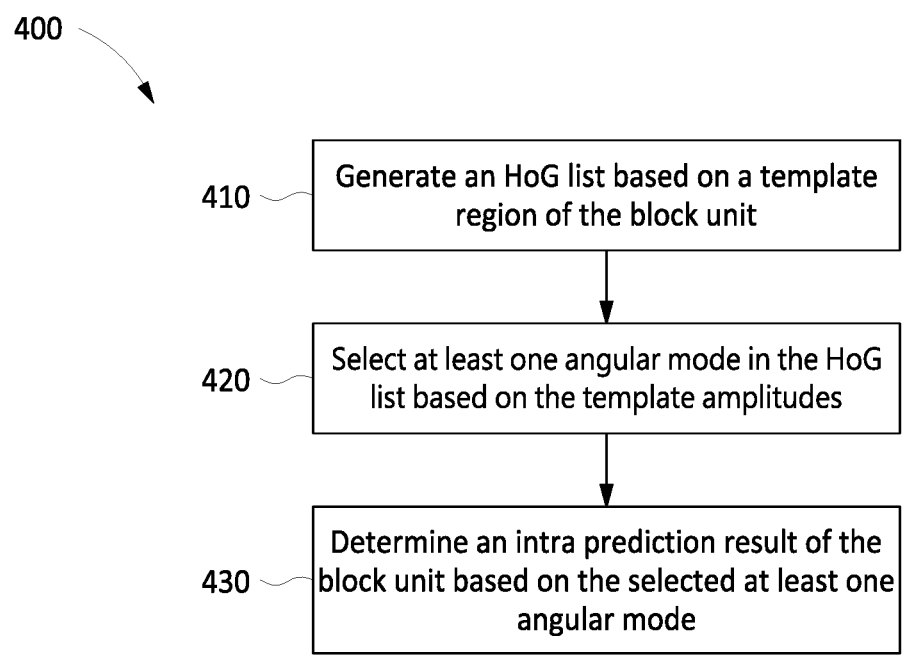
FIG. 4 illustrates a flowchart of a decoder-side intra mode derivation (DIMD) method for performing an intra prediction on a block unit according to an implementation of the present disclosure.

FIG. 4 illustrates a flowchart of a DIMD method for performing an intra prediction on a block unit according to an implementation of the present disclosure.

The DIMD method 400 may be performed using the configurations illustrated in FIG. 1 and FIG. 2, and various elements of these figures are referenced with regard to the DIMD method 400. Each block illustrated in FIG. 4 may represent one or more processes, methods, or subroutines performed.

The order of blocks in FIG. 4 is illustrative only and may change. Additional blocks may be added or fewer blocks may be utilized without departing from the present disclosure.

At block 410, the decoder module 124 may generate a Histogram of Gradient (HoG) list based on a template region of the block unit.

Specifically, the template region of a block unit may include a reconstructed region neighboring the block unit. In an example, the template region of a block unit may include N neighboring reference lines of the block unit, where N may be a positive integer.

Specifically, the HoG list may include a plurality of angular modes associated with the block unit and a plurality of template amplitudes corresponding to the plurality of angular modes. More specifically, when generating the HoG list, the decoder module 124 may apply a filter (for example, but not limited to, a Sobel filter) on each of a plurality of positions in the template region. Based on the filtering result, the decoder module 124 may calculate a plurality of template angles and a plurality of template amplitudes corresponding to the plurality of template angles. As each of the plurality of template angles may correspond to one of the plurality of angular modes, the HoG list may be obtained.

Figure 5A:
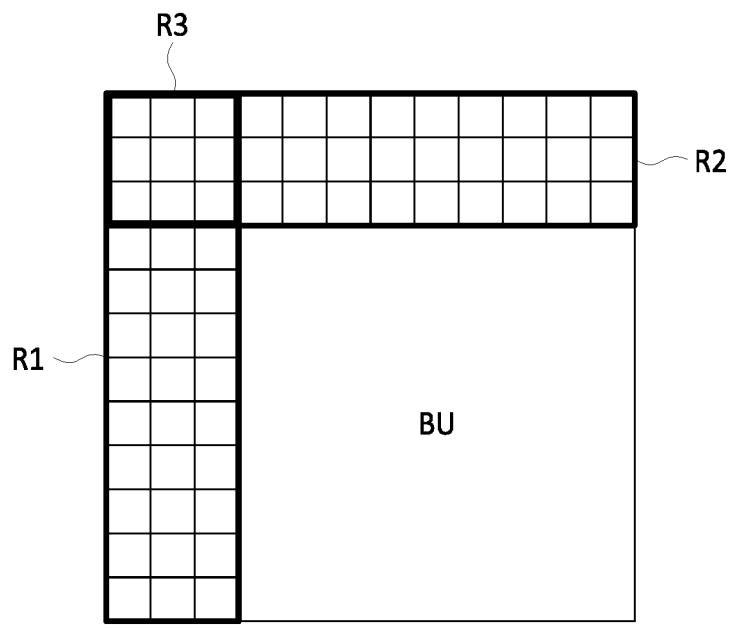
FIGS. 5A to 5C illustrate schematic diagrams depicting generating a histogram of gradient (HoG) list according to an example implementation of the present disclosure.
Figure 5B:
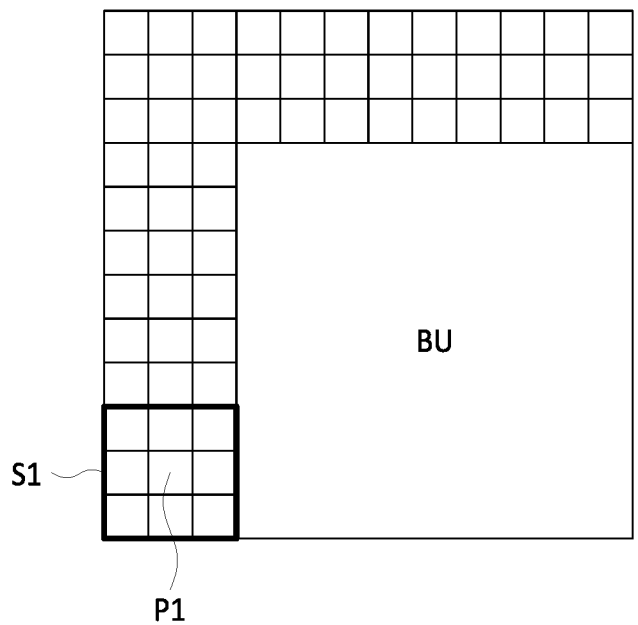
Figure 5C:
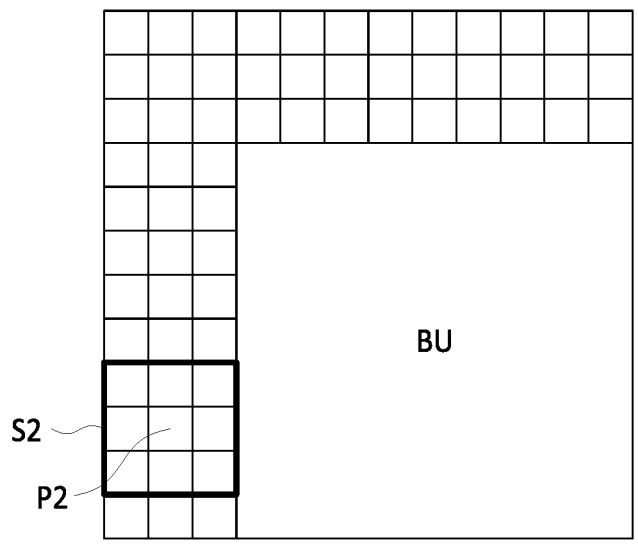

FIGS. 5A to 5C illustrate schematic diagrams depicting generating the HoG list according to an example implementation of the present disclosure.

Referring to FIG. 5A, the template region of the block unit BU includes 3 neighboring reference lines of the block unit BU. In this case, the template region includes a first reconstructed region R1 adjacent to the left side of the block unit BU, a second reconstructed region R2 adjacent to the upper side of the block unit BU, and a third reconstructed region R3 joining the first reconstructed region R1 and the second reconstructed region R2.

In some implementations, the filter used for generating the HoG list may be, for example, a Sobel filter, which includes a horizontal filter kernel $$\text{(e.g., } G_x: \begin{bmatrix} 1 & 0 & -1 \\ 2 & 0 & -2 \\ 1 & 0 & -1 \end{bmatrix})$$

and a vertical filter kernel $$\text{(e.g., } G_y: \begin{bmatrix} 1 & 2 & 1 \\ 0 & 0 & 0 \\ -1 & -2 & -1 \end{bmatrix}).$$

Referring to FIG. 5B, for N*N (e.g., 3*3=9) reconstructed samples S1 with respect to a first position P1, the horizontal filter kernel and the vertical filter kernel may be applied respectively, and a first horizontally filtered result and a first vertically filtered result may be obtained. For example, the first horizontally filtered result (e.g., $G_{x1}$) and the first vertically filtered result (e.g., $G_{y1}$) may be obtained by:

$$G_{x1} = G_x \cdot S1;$$

$$G_{y1} = G_y \cdot S1.$$

In some implementations, a first template angle corresponding to the first position P1 may be calculated by an arctangent of the first vertically filtered result over the first horizontally filter result $$\text{(e.g., } \arctan\left(\frac{G_{y1}}{G_{x1}}\right)),$$

and a first template amplitude corresponding to the first position P1 may be calculated by a summation of determinants of the first horizontally filtered result and the first vertically filtered result (e.g., $|G_{x1}|+|G_{y1}|$). As the first template angle corresponding to the first position P1 may be mapped to a first angular mode, a correspondence of the first angular mode and the first template amplitude may be thus obtained.

Referring to FIG. 5C, for N*N (e.g., 3*3=9) reconstructed samples S2 with respect to a second position P2, the horizontal filter kernel and the vertical filter kernel may be applied respectively, and a second horizontally filtered result and a second vertically filtered result may be obtained. For example, the second horizontally filtered result (e.g., $G_{x2}$) and the second vertically filtered result (e.g., $G_{y2}$) may be obtained by:

$$G_{x2} = G_x \cdot S2;$$

$$G_{y2} = G_y \cdot S2.$$

In some implementations, a second template angle corresponding to the second position P2 may be calculated by an arctangent of the second vertically filtered result over the second horizontally filter result $$\text{(e.g., } \arctan\left(\frac{G_{y2}}{G_{x2}}\right)),$$

and a second template amplitude corresponding to the second position P2 may be calculated by a summation of determinants of the second horizontally filtered result and the second vertically filtered result (e.g., $|G_{x2}|+|G_{y2}|$). As the second template angle corresponding to the second position P2 may be mapped to a second angular mode, a correspondence of the second angular mode and the second template amplitude may thus be obtained.

In the same analogy as described with reference to FIG. 5B and FIG. 5C, a plurality of positions (e.g., on the middle line of the template region) in the template region may be traversed, and the HoG list of the block unit BU including a plurality of angular modes and a plurality of template amplitudes corresponding to the plurality of angular modes may be obtained.

Continuing with FIG. 4, at block 420, the decoder module 124 may select at least one of the plurality of angular modes in the HoG list based on the template amplitudes.

Specifically, the selected at least one angular mode corresponds to at least one largest template amplitude within the plurality of template amplitudes in the HoG list.

In some implementations, the decoder module 124 may select one of the plurality of angular modes which corresponds to the largest template amplitude.

In some implementations, the decoder module 124 may select more than one (e.g., K) angular modes from the plurality of angular modes which correspond to the largest template amplitudes (e.g., the first K largest template amplitudes).

At block 430, the decoder module 124 may determine an intra prediction result of the block unit based on the selected at least one angular mode.

In some implementations, in a case that only one angular mode is selected, the decoder module 124 may determine the intra prediction result of the block unit based on the selected angular mode.

In some implementations, in a case that only one angular mode is selected, the decoder module 124 may determine the intra prediction result of the block unit based on the selected angular mode and at least one default predictor. The at least one default predictor may include, for example, but is not limited to, a planar mode. The decoder module 124 may calculate a weighted average (e.g., a blend) of a prediction determined based on the selected angular mode and another prediction determined based on the at least one default predictor to obtain a final prediction. As such, the decoder module 124 may determine the intra prediction result of the block unit based on the final prediction. For example, the decoder module 124 may consider the final prediction to be the intra prediction result.

In some implementations, in a case that more than one angular mode is selected, the decoder unit 124 may calculate a weighted average (e.g., a blend) of predictions performed based on the selected angular modes to obtain the final prediction, and determine the intra prediction result to be the final prediction. Weights of the selected angular modes may be, for example, proportional to the corresponding template amplitudes.

For example, three intra prediction modes M1, M2, M3 with template amplitudes A1, A2, A3 are selected and weights corresponding to the three intra prediction modes are W1, W2, W3. In this case, W1 may equal $$\left(\frac{A1}{(A1+A2+A3)}\right) \times W;$$

W2 may equal $$\left(\frac{A2}{(A1+A2+A3)}\right) \times W;$$

and W3 may equal $$\left(\frac{A3}{(A1+A2+A3)}\right) \times W,$$

where W is a total weight to be distributed. In some implementations, the total weight may be 1, but is not limited thereto. In this case, the decoder module 124 may determine a first prediction P1 based on the intra prediction mode M1, determine a second prediction P2 based on the intra prediction mode M2, determine a third prediction P3 based on the intra prediction mode M3, and determine the final prediction P or the intra prediction result of the block unit as W1*P1+W2*P2+W3*P3.

In some implementations, in a case that more than one angular mode is selected, the decoder module 124 may determine the intra prediction result of the block unit based on the selected angular modes and at least one default predictor. The at least one default predictor may include, for example, but is not limited to, a planar mode. The decoder module 124 may calculate a weighted average (e.g., a blend) of the selected angular modes and the at least one default predictor to obtain the final prediction, where weights of the selected angular modes may be, for example, proportional to the corresponding template amplitudes. As such, the decoder module 124 may determine the intra prediction result of the block unit based on the final prediction.

For example, a default mode (e.g., default predictor) M1 and two selected intra prediction modes M2, M3 with template amplitudes A2, A3 are used for determining the intra prediction result. In a case that weight W1 of the default mode M1 is set to 22/64, weights W2, W3 of the intra prediction modes M2, M3 may be $$\left(\frac{A2}{(A2+A3)}\right) \times \frac{42}{64} \text{ and } \left(\frac{A3}{(A2+A3)}\right) \times \frac{42}{64},$$

respectively. In this case, the decoder module 124 may determine a first prediction P1 based on the default mode M1, determine a second prediction P2 based on the intra prediction mode M2, determine a third prediction P3 based on the intra prediction mode M3, and determine the final prediction P or the intra prediction result pf the block unit as W1*P1+W2*P2+W3*P3.

Template-Based Intra Mode Derivation (TIMD) Method

In some implementations, the intra prediction methods may include a TIMD method. Specifically, the TIMD method may be used for performing the intra prediction so as to obtain the intra prediction result. In the present disclosure, performing an intra prediction based on the TIMD method may be referred to as performing the intra prediction based on a TIMD mode.

Figure 6:
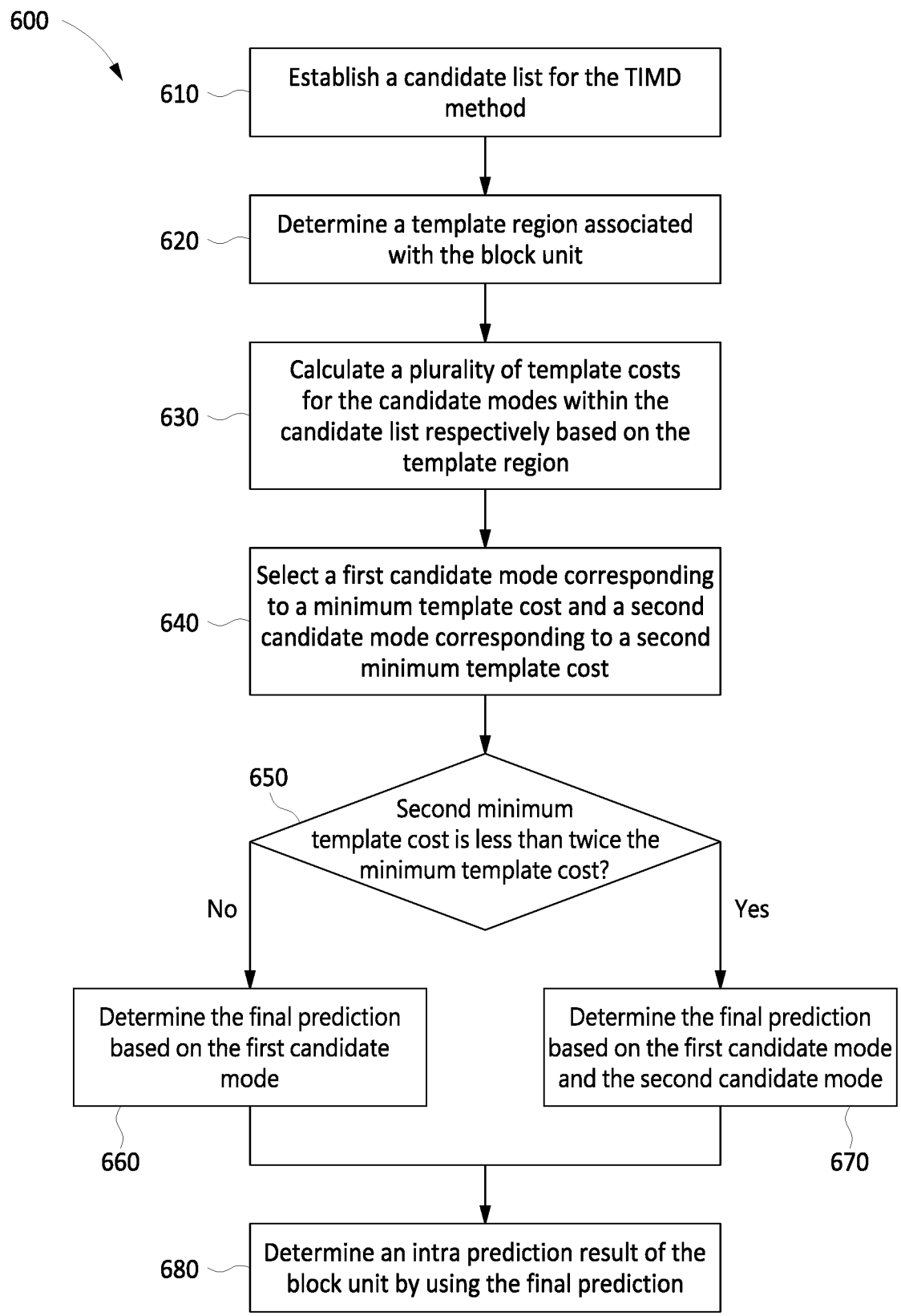
FIG. 6 illustrates a flowchart of a template-based intra mode derivation (TIMD) method for performing an intra prediction on a block unit according to an implementation of the present disclosure.

FIG. 6 illustrates a flowchart of a TIMD method for performing an intra prediction on a block unit according to an implementation of the present disclosure.

The TIMD method 600 may be performed using the configurations illustrated in FIG. 1 and FIG. 2, and various elements of these figures are referenced with regard to the TIMD method 600. Each block illustrated in FIG. 6 may represent one or more processes, methods, or subroutines performed.

The order of blocks in FIG. 6 is illustrative only and may change. Additional blocks may be added, or fewer blocks may be utilized without departing from the present disclosure.

At block 610, the decoder module 124 may establish a candidate list for the TIMD method. The candidate list includes a plurality of intra prediction modes, and the plurality of intra prediction modes included in the candidate list are also referred to as candidate modes.

In some implementations, in order to establish the candidate list for the TIMD method, the decoder module 124 may generate a HoG list of the block unit first and select at least one angular mode from the HoG list. The at least one angular mode selected from the HoG list is included into the candidate list for the TIMD method. The generation of the HoG list has been described in the previous paragraphs, and therefore is not repeated hereafter.

For example, in order to establish the candidate list for the TIMD method, the decoder module 124 may perform the DIMD method first to select at least one angular mode with at least one largest template amplitude from the HoG list, and the selected at least one angular mode is included into the candidate list.

In some implementations, in order to establish the candidate list for the TIMD method, the decoder module 124 may construct a most probable mode (MPM) list of the block unit, and the constructed MPM list is included into the candidate list for the TIMD method. The MPM list may include, for example, at least one of a planar mode, a DC mode, or one or more angular modes.

The MPM list of the block unit may, for example, include a primary MPM list (PMPM) with 6 entries and a secondary MPM list (SMPM) with 16 entries. The first entry of the MPM list may be a planar mode. The remaining entries may include the intra prediction modes of several preset neighboring blocks (e.g., left, above, below-left, above-right, and above-left in a case that the block unit is vertical; above, left, below-left, above-right, and above-left in a case that the block unit is horizontal) of the block unit, the directional modes with added offset from the first two available directional modes of the preset neighboring blocks, and the default modes. However, definitions of the preset neighboring blocks are not limited in such a manner in the present disclosure. It is noted that one of ordinary skill in the art should realize how to construct an MPM list, for example, based on the adopted video coding standard. Therefore, more details of the construction of the MPM list are not repeated hereafter.

In some implementations, the decoder module 124 may include the MPM list into the candidate list.

In some implementations, the decoder module 124 may include the at least one angular mode selected from the generated HoG list and the constructed MPM list into the candidate list.

After establishing the candidate list for the TIMD method, the decoder module 124 may determine an intra prediction by using the TIMD method based on the candidate list, details of which are described with reference to blocks 620 to 680 in the following discussion.

At block 620, the decoder module 124 may determine a template region associate with the block unit.

The template region determined for the TIMD method is described with reference to FIG. 7 below.

Figure 7:
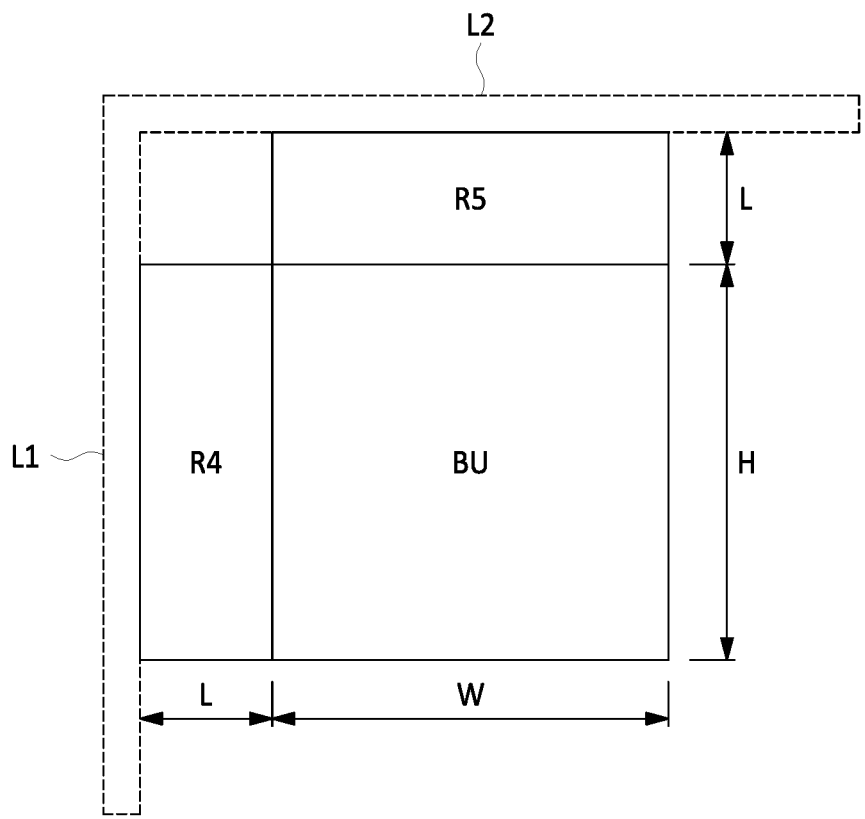
FIG. 7 illustrates a schematic diagram depicting the TIMD method according to an example implementation of the present disclosure.

FIG. 7 illustrates a schematic diagram depicting the TIMD method according to an example implementation of the present disclosure.

The template region of the block unit BU and a plurality of reference samples are shown in FIG. 7. Specifically, the block unit BU has a width W and a height H, and the template region of the block unit BU includes a first reconstructed block R4 left-neighboring the block unit BU and a second reconstructed block R5 upper-neighboring the block unit BU.

In some implementations, a width of the first reconstructed block R4 is the same as a height of the second reconstructed block R5. For example, the width of the first reconstructed block R4 and the height of the second reconstructed block R5 are L.

In some implementations, the value of L may be associated with the size of the block unit BU. For example, in a case that the block size of the block unit is less than 16*16, the value of L may be equal to 2; in a case that the block size of the block unit is larger than or equal to 16*16, the value of L may be equal to 4. However, the value of L is not limited to such examples herein.

Returning to FIG. 6, after the template region is determined, at block 630, the decoder module 124 may calculate a plurality of template costs for the plurality of candidate modes within the candidate list respectively based on the template region.

Specifically, the decoder module 124 may generate a plurality of predictions of the template region corresponding to the plurality of candidate modes within the candidate list, and may calculate a plurality of template costs of the plurality of predictions based on a template reconstruction of the template region. Therefore, each of the plurality of candidate modes within the candidate list may correspond to one of the plurality of template costs.

It is noted that the template reconstruction of the template region may be referred to as the reconstructed samples in the template region, and the template cost may be, for example, a sum of absolute difference (SAD) or a sum of absolute transformed difference between the prediction of the template region and the template reconstruction of the template region.

In order to generate the prediction of the template region, a plurality of reference samples of the template region may be needed.

Referring to FIG. 7, the plurality of reference samples may compose a first reference line L1 left-adjacent to the first reconstructed block R4 and a second reference line L2 upper-adjacent to the second reconstructed block R5. The length of the first reference line L1 may be 2*(L+H)+1 and the length of the second reference line L2 may be 2*(L+W)+1.

The decoder module 124 may generate the $n^{th}$ prediction of the template region based on the plurality of reference samples of the template region by using the $n^{th}$ candidate mode of the candidate list and calculate the $n^{th}$ template cost of the $n^{th}$ prediction based on a template reconstruction of the template region; generate the $(n+1)^{th}$ prediction of the template region based on the plurality of reference samples of the template region by using the $(n+1)^{th}$ candidate mode of the candidate list and calculate the $(n+1)^{th}$ template cost of the $(n+1)^{th}$ prediction based on the template reconstruction of the template region; and so on. As such, a plurality of template costs corresponding to a plurality of candidate modes within the candidate list may be obtained.

In some implementations, the decoder module 124 may select one of the plurality of candidate modes within the candidate list with a minimum template cost as a final predictor, and determine an intra prediction result of the block unit by using the final predictor (e.g., the selected candidate mode).

Returning to FIG. 6, in some implementations, at block 640, the decoder module 124 may select a first candidate mode of the plurality of candidate modes corresponding to a minimum template cost in the candidate list, and a second candidate mode of the plurality of candidate modes corresponding to a second minimum template cost in the candidate list. Then, the decoder module 124 may determine the final prediction based on the first candidate mode and the second candidate mode.

Specifically, after the first candidate mode with the minimum template cost and the second candidate mode with the second minimum template cost are selected, at block 650, the decoder module 124 may determine whether the second minimum template cost is less than twice the minimum template cost.

In a case that the second minimum template cost is not less than (e.g., greater than or equal to) twice the minimum template cost, the block 660 may be entered. At block 660, the decoder module 124 may determine the final prediction based on the first candidate mode which corresponds to the minimum template cost. For example, the decoder module 124 may determine the final prediction by using the first candidate mode.

In a case that the second minimum template cost is less than twice the minimum template cost, the block 670 may be entered. At block 670, the decoder module 124 may determine the final prediction based on the first candidate mode and the second candidate mode. Specifically, the decoder unit 124 may determine the final prediction by calculating a weighted average of a prediction determined based on the first candidate mode and another prediction determined based on the second candidate mode, where weights are proportional to the corresponding template cost. For example, in a case that the minimum template cost corresponding to the first candidate mode CM1 is TC1 and the second minimum template cost corresponding to the second candidate mode CM2 is TC2, the weight of the first candidate mode CM1 may be $$\frac{TC1}{TC1+TC2};$$

and the weight of the second candidate mode CM2 may be $$\frac{TC2}{TC1+TC2}.$$

In this case, the decoder module 124 may determine a first prediction P1 based on the first candidate mode CM1, determine a second prediction P2 based on the second candidate mode CM2, and determine the final prediction to be $$\frac{TC1 \times P1 + TC2 \times P2}{TC1+TC2}.$$

After the final prediction is determined, at block 680, the decoder module 124 may determine an intra prediction result of the block unit by using the final prediction. For example, the decoder module 124 may determine the intra prediction result as the final prediction.

DIMD Fusion Method

In some implementations, the intra prediction method may include a fusion method.

In some implementations, a flag may be used to indicate that a block unit (e.g., the current block) is predicted by using the fusion method.

Specifically, the fusion method may be used for performing the intra prediction so as to obtain the intra prediction result. More specifically, the fusion method may generate an intra prediction of a block unit based on multiple predictions of the block units performed by using different intra prediction modes and determine an intra prediction result based on the multiple predictions.

In some implementations, at least two of the intra predication modes of a DIMD mode, a TIMD mode, a planar mode, a linear model mode, a DC mode, and an angular mode are used to respectively perform the intra prediction on the block unit and generate at least two of the multiple predictions.

In some implementations, the multiple predictions may be averaged to determine the intra prediction result. In some implementations, the multiple predictions may be calculated using a weighted average to determine the intra prediction result. The weight of each prediction may be, for example, associated with the mode used, the corresponding template cost, etc. However, it should be noted that the determination of weights of multiple predictions in the hybrid method is not limited in such a manner in the present disclosure.

For example, the decoder module 124 may determine a first prediction by using a first intra prediction mode or method, determine a second prediction by using a second intra prediction mode or method, and determine the intra prediction result based on the first prediction and the second prediction. For example, the intra prediction result may be determined by calculating an average or a weighted average (e.g., a blend) of the first prediction and the second prediction.

It should be noted that the number of multiple predictions used in the fusion method is not limited in the present disclosure. In other implementations, the number of multiple predictions used in the hybrid method may be three, four, or more.

Figure 8A:
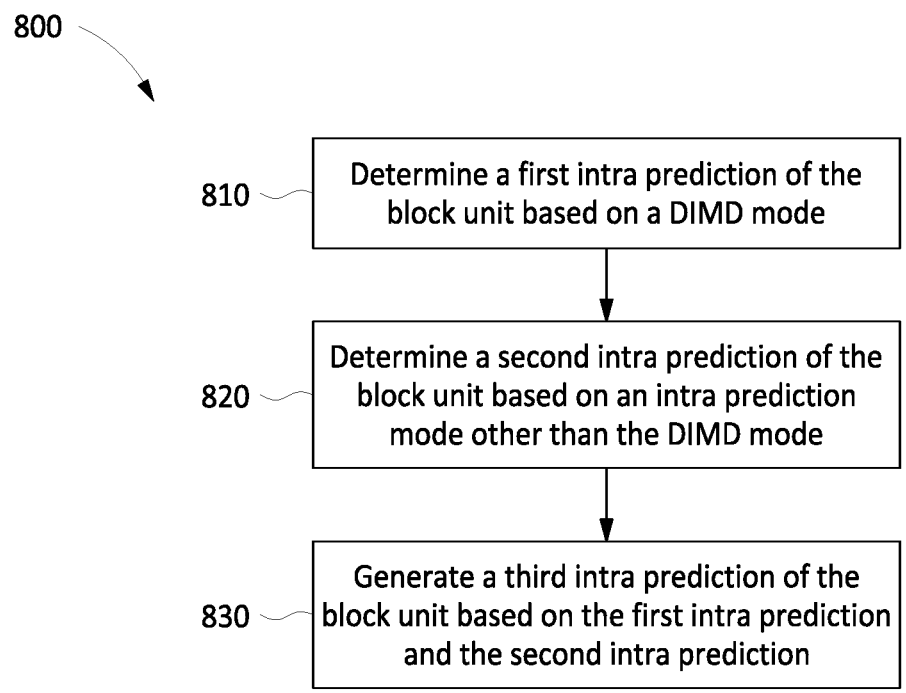
FIG. 8A illustrates a flowchart of a fusion method for performing an intra prediction on a block unit according to an implementation of the present disclosure.

FIG. 8A illustrates a flowchart of a fusion method for performing an intra prediction on a block unit according to an implementation of the present disclosure.

The fusion method 800 may be performed using the configurations illustrated in FIG. 1 and FIG. 2, and various elements of these figures are referenced with regard to the fusion method 800. Each block illustrated in FIG. 8A may represent one or more processes, methods, or subroutines performed.

The order of blocks in FIG. 8A is illustrative only and may change. Additional blocks may be added, or fewer blocks may be utilized without departing from the present disclosure.

It is noted that, in some implementations, one of the multiple predictions used in the fusion method is determined based on the DIMD method (e.g., by using the DIMD mode). In this case, the fusion method may be also referred to as a DIMD fusion method in the present disclosure.

At block 810, the decoder module 124 may determine a first intra prediction of the block unit based on a DIMD mode. Details of the DIMD mode has been described in the previous paragraphs, and therefore which are not repeated hereafter.

At block 820, the decoder unit 124 may determine a second intra prediction of the block unit based on an intra prediction mode other than the DIMD mode.

In some implementations, the intra prediction mode other than the DIMD mode may include the TIMD mode.

In some implementations, the intra prediction mode other than the DIMD mode may include at least one of a planar mode, a linear model mode, a DC mode, or an angular mode different mode different from the DIMD mode. To be specific, a first angular mode may be selected for determining the first intra prediction of the block unit by performing the DIMD method. In a case that another intra prediction mode used in the DIMD fusion method is also an angular mode, the other intra prediction mode may be a second angular mode different from the first angular mode.

At block 830, the decoder module 124 may generating a third intra prediction based on the first intra prediction and the second intra prediction. The third intra prediction may be, for example, considered by the decoder module 124 to be the intra prediction result of the block unit.

Figure 8B:
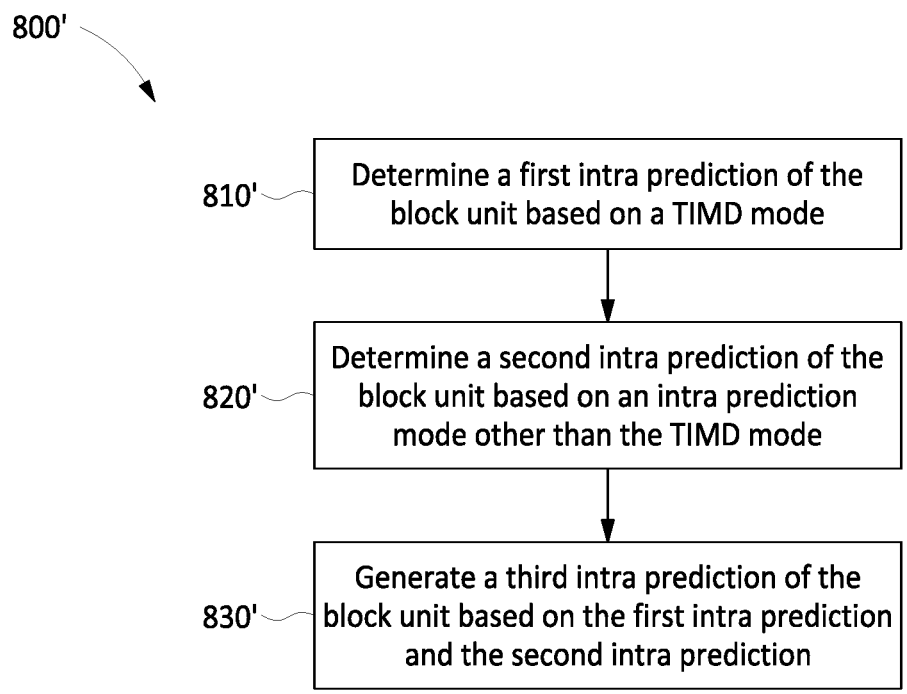
FIG. 8B illustrates a flowchart of a fusion method for performing an intra prediction on a block unit according to an implementation of the present disclosure.

FIG. 8B illustrates a flowchart of a fusion method for performing an intra prediction on a block unit according to an implementation of the present disclosure.

The fusion method 800' may be performed using the configurations illustrated in FIG. 1 and FIG. 2, and various elements of these figures are referenced with regard to the fusion method 800'. Each block illustrated in FIG. 8B may represent one or more processes, methods, or subroutines performed.

The order of blocks in FIG. 8B is illustrative only and may change. Additional blocks may be added, or fewer blocks may be utilized without departing from the present disclosure.

It is noted that, in some implementations, one of the multiple predictions used in the fusion method is determined based on the TIMD method (e.g., by using the TIMD mode). In this case, the fusion method may be also referred to as a TIMD fusion method in the present disclosure.

At block 810', the decoder module 124 may determine a first intra prediction of the block unit based on a TIMD mode. Details of the TIMD mode has been described in the previous paragraphs, and therefore which are not repeated hereafter.

At block 820', the decoder unit 124 may determine a second intra prediction of the block unit based on an intra prediction mode other than the TIMD mode.

In some implementations, the intra prediction mode other than the TIMD mode may include the DIMD mode.

In some implementations, the intra prediction mode other than the TIMD mode may include at least one of a planar mode, a linear model mode, a DC mode, or an angular mode different mode different from the TIMD mode.

At block 830', the decoder module 124 may generating a third intra prediction based on the first intra prediction and the second intra prediction. The third intra prediction may be, for example, considered by the decoder module 124 to be the intra prediction result of the block unit.

In some implementations, the third intra prediction described with reference to FIG. 8A or FIG. 8B may be an average of the first intra prediction and the second intra prediction.

In some implementations, the third intra prediction described with reference to FIG. 8A or FIG. 8B may be a weighted average of the first intra prediction and the second intra prediction. Specifically, the first intra prediction corresponds to a first weight and the second intra prediction corresponds to a second weight. The third intra prediction may be a weighted average of the first intra prediction and the second intra prediction based on the first weight and the second weight.

In some implementations, weights (e.g., the first weight and the second weight) of each prediction (e.g., the first intra prediction and the second intra prediction) may be, for example, set as default on the decoder side and the encoder side.

In some implementations, weights (e.g., the first weight and the second weight) of each prediction (e.g., the first intra prediction and the second intra prediction) may be, for example, determined being associated with the mode used, the corresponding template cost, etc. However, it should be noted that the determination of weights of multiple predictions in the fusion method is not limited in the present disclosure.

Based on the intra prediction methods described above, better predictions may be achieved, and thus the coding efficiency may be improved.

At least one flag may be used to indicate how to perform the intra prediction for the block unit (e.g., current block). For example, the at least one flag may indicate at least one of a specific mode, a specific method or a specific classification for performing the intra prediction. By decoding the at least one flag, the decoder unit 124 may perform the intra prediction accordingly.

In some implementations, the at least one flag may include a DIMD flag. The DIMD flag may be used to indicate whether the intra prediction of the block unit is performed based on the DIMD method.

In some implementations, the at least one flag may include a TIMD flag. The TIMD flag may be used to indicate whether the intra prediction of the block unit is performed based on the TIMD method.

In some implementations, the at least one flag may include a fusion flag. The fusion flag may be used to indicate whether the intra prediction of the block unit is performed based on the fusion method.

Control Method

Prediction tools may be classified into two classifications including a first classification and a second classification. At least one flag is introduced in the present disclosure for efficiently signaling the prediction tools by indicating one of the classifications.

In some implementations, a usage of a template matching (TM matching) may be a criterion for classification. For example, the first classification may include prediction tools relying on a TM matching, and the second classification may include prediction tools not relying on the TM matching. The TM matching may, for example, refer to a process including defining a reconstructed template region, determining a prediction of the template region, and determining a template cost of the template region based on the prediction of the template region and a reconstruction of the template region.

In some implementations, whether a (reconstructed) template region of a block unit is used for deriving the prediction tool (mode) for predicting the block unit on both the encoder side and the decoder side may be a criterion for classification. For example, the first classification may include prediction tools (modes) that are derived based on the template region on both the encoder side and the decoder side, and the second classification may include prediction tools (modes) that are not derived based on the template region.

In some implementations, a first flag may be used to select one of the two classifications. In some implementations, a second flag may be further used to indicate a specific prediction tool of the selected classification.

In some implementations, the second flag may always be used regardless of the value of the first flag.

In some implementations, the second flag may be used only when a specific classification is selected by the first flag. For example, the second flag may be used (e.g., parsed) in a case that the first flag is set to true, and the second flag may not be used (e.g., parsed) in a case that the first flag is set to false.

In some implementations, the prediction tools may be inter prediction tools. The first classification of the inter prediction tools may include, for example, inter prediction tools relying on the TM matching, such as a Template-Advance Motion Vector Prediction (TM-AMVP), a Template-merge (TM-Merge), a Template-Geometric Prediction Mode (TM-GPM), a Template Combined Inter and Intra Prediction (TM-CIIP), Template-Merge mode with Motion Vector Difference (TM-MMVD), and an Adaptive Reordering of Merge Candidates (ARMC). The second classification of the inter prediction tools may include, for example, inter prediction tools not relying on the TM matching, such as an Advance Motion Vector Prediction (AMVP), a merge mode, a Geometric Prediction Mode (GPM), a Combined Inter and Intra Prediction (CIIP), and a Mode with Motion Vector Difference (MMVD).

In some implementations, the first flag may be used to indicate whether an inter prediction tool in the first classification is used for performing the inter prediction. For example, in a case that the first flag is set to true, the inter prediction may be performed based on one of the inter prediction tools of the first classification (e.g., that uses the template matching); in a case that the first flag is set to false, the inter prediction is performed based on one of the inter prediction tools of the second classification (e.g., that does not use the template matching).

In some implementations, a second flag may be used in addition to the first flag. The second flag may be used to specifically indicate the inter prediction tool of the classification selected by the first flag. For example, the second flag may indicate the TM-AMVP in a case that the first classification is selected by the first flag. For example, the second flag may indicate the AMVP in a case that the second classification is selected by the first flag.

In some implementations, the prediction tools may be intra prediction tools. The first classification of the intra prediction tools may include, for example, intra prediction modes that are derived by a (reconstructed) template region on both the encoder side and the decoder side, such as a DIMD mode and a TIMD mode. The second classification of the intra prediction tools may include, for example, intra prediction modes that are not derived by the template region, such as a planar mode, a linear model mode, a DC mode, and an angular mode.

In some implementations, the first flag may be used to indicate whether an intra prediction tool in the first classification is used for performing the intra prediction. For example, the first flag may indicate whether at least one of the DIMD mode or the TIMD mode is used for performing the intra prediction. In a case that the first flag is set to true, the intra prediction of a block unit (e.g., the current block) is performed based on the DIMD mode or the TIMD mode; in a case that the first flag is set to false, the intra prediction of the block unit is not performed based on either the DIMD mode or the TIMD mode.

In some implementations, in a case that the first flag is set to true, a second flag may be used in addition to the first flag.

The second flag may be used to specifically indicate the intra prediction mode of the first classification which is selected by the first flag. For example, the second flag may indicate whether the intra prediction is performed based on the DIMD mode or the TIMD mode.

In some implementations, the second flag is used (e.g., parsed) only when the first flag is set to true. For example, the second flag is used (e.g., parsed) only when the first flag indicates that the intra prediction of the block unit is performed based on the DIMD mode or the TIMD mode, and the second flag indicates a specific one of the DIMD mode and the TIMD mode.

In some implementations, the flags described above may present in DCI/OPI/VPS/SPS/PPS/PH/SH/CTU or other headers of which the control level is higher than the coding unit level.

In some implementations, the first flag described above may be a high-level syntax or included in a high-level syntax structure. In some implementations, the second flag described above may be a low-level syntax or included in a low-level syntax structure. The high-level syntax structure may be, for example, one of DCI/OPI/VPS/SPS/PPS. The low-level syntax structure may be, for example, one of PH/SH/CTU/CU/PU.

Figure 9:
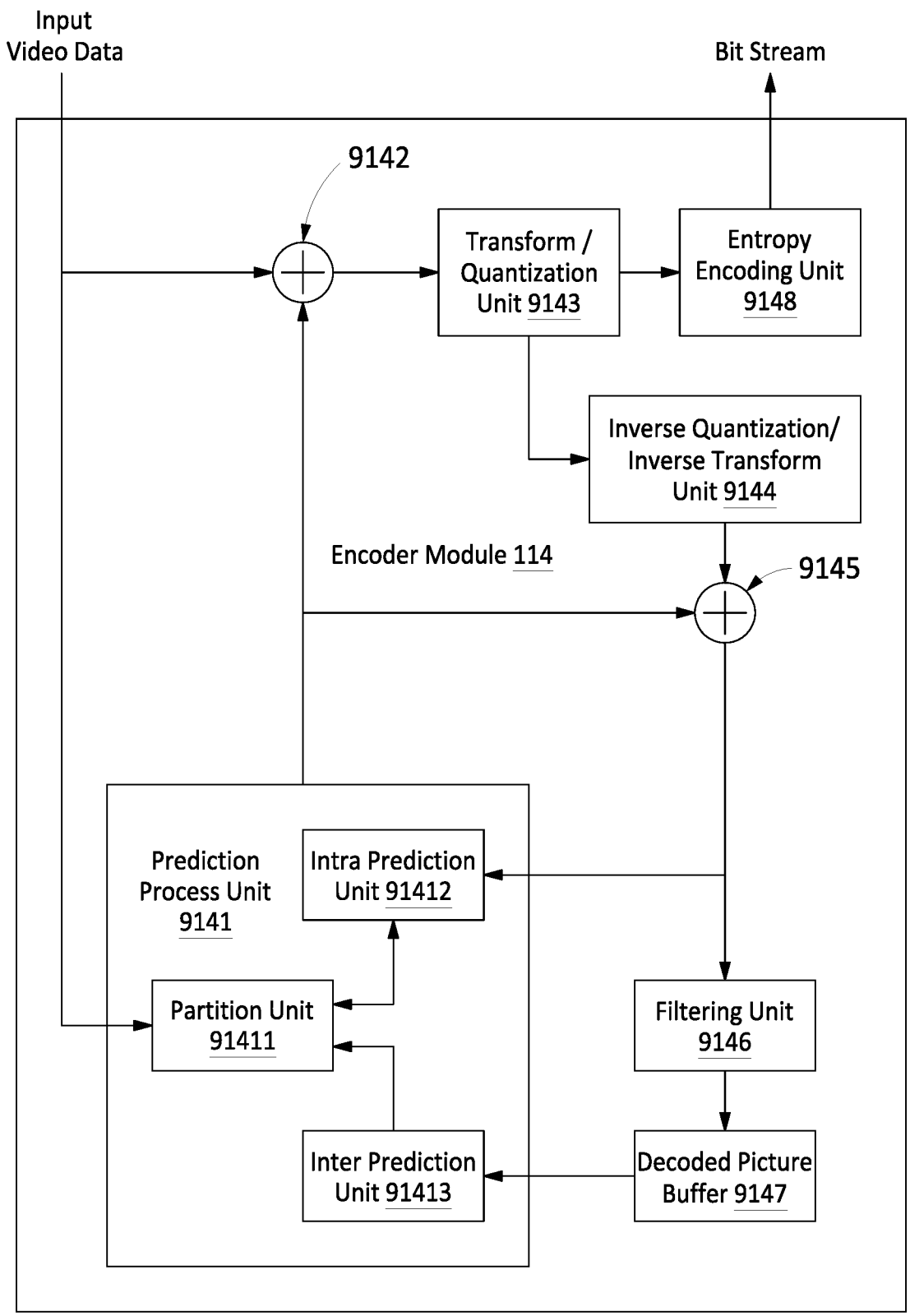
FIG. 9 illustrates a block diagram of an encoder module of a first electronic device illustrated in FIG. 1 according to an implementation of the present disclosure.

FIG. 9 illustrates a block diagram of the encoder module 114 of the first electronic device 110 illustrated in FIG. 1 according to an implementation of the present disclosure. The encoder module 114 may include a prediction processor (e.g., prediction process unit 9141), at least a first summer (e.g., first summer 9142) and a second summer (e.g., second summer 9145), a transform/quantization processor (e.g., transform/quantization unit 9143), an inverse quantization/inverse transform processor (e.g., inverse quantization/inverse transform unit 9144), a filter (e.g., filtering unit 9146), a decoded picture buffer (e.g., decoded picture buffer 9147), and an entropy encoder (e.g., entropy encoding unit 9148). The prediction process unit 9141 of the encoder module 114 may further include a partition processor (e.g., partition unit 91411), an intra prediction processor (e.g., intra prediction unit 91412), and an inter prediction processor (e.g., inter prediction unit 91413).

The encoder module 114 may receive the source video and encode the source video to output a bitstream. The encoder module 114 may receive source video including a plurality of image frames and then divide the image frames according to a coding structure. Each of the image frames may be divided into at least one image block.

The at least one image block may include a luminance block having a plurality of luminance samples and at least one chrominance block having a plurality of chrominance samples. The luminance block and the at least one chrominance block may be further divided to generate macroblocks, coding tree units (CTUs), coding blocks (CBs), subdivisions thereof, and/or another equivalent coding unit.

The encoder module 114 may perform additional subdivisions of the source video. It should be noted that the disclosed implementations are generally applicable to video coding regardless of how the source video is partitioned prior to and/or during the encoding.

During the encoding process, the prediction process unit 9141 may receive a current image block of a specific one of the image frames. The current image block may be the luminance block or one of the chrominance blocks in the specific image frame.

The partition unit 91411 may divide the current image block into multiple block units. The intra prediction unit 91412 may perform intra-predictive coding of a current block unit relative to one or more neighboring blocks in the same frame as the current block unit in order to provide spatial prediction. The inter prediction unit 91413 may perform inter-predictive coding of the current block unit relative to one or more blocks in one or more reference image blocks to provide temporal prediction.

The prediction process unit 9141 may select one of the coding results generated by the intra prediction unit 91412 and the inter prediction unit 91413 based on a mode selection method, such as a cost function. The mode selection method may be a rate-distortion optimization (RDO) process.

The prediction process unit 9141 may determine the selected coding result and provide a predicted block corresponding to the selected coding result to the first summer 9142 for generating a residual block and to the second summer 9145 for reconstructing the encoded block unit. The prediction process unit 9141 may further provide syntax elements such as motion vectors, intra mode indicators, partition information, and other syntax information to the entropy encoding unit 9148.

The intra prediction unit 91412 may intra predict the current block unit. The intra prediction unit 91412 may determine an intra prediction mode directed toward a reconstructed sample neighboring the current block unit in order to encode the current block unit.

The intra prediction unit 91412 may encode the current block unit using various intra prediction modes. The intra prediction unit 91412 of the prediction process unit 9141 may select an appropriate intra prediction mode from the selected modes. The intra prediction unit 91412 may encode the current block unit using a cross component prediction mode to predict one of the two chroma components of the current block unit based on the luma components of the current block unit. The intra prediction unit 91412 may predict a first one of the two chroma components of the current block unit based on the second of the two chroma components of the current block unit.

The inter prediction unit 91413 may inter predict the current block unit as an alternative to the intra prediction performed by the intra prediction unit 91412. The inter prediction unit 91413 may perform motion estimation to estimate motion of the current block unit for generating a motion vector.

The motion vector may indicate a displacement of the current block unit within the current image block relative to a reference block unit within a reference image block. The inter prediction unit 91413 may receive at least one reference image block stored in the decoded picture buffer 9147 and estimate the motion based on the received reference image blocks to generate the motion vector.

The first summer 9142 may generate the residual block by subtracting the prediction block determined by the prediction process unit 9141 from the original current block unit. The first summer 9142 may represent the component or components that perform this subtraction.

The transform/quantization unit 9143 may apply a transform to the residual block in order to generate a residual transform coefficient and then quantize the residual transform coefficients to further reduce bit rate. The transform may be one of a DCT, DST, AMT, MDNSST, HyGT, signal dependent transform, KLT, wavelet transform, integer transform, sub-band transform, or a conceptually similar transform.

The transform may convert the residual information from a pixel value domain to a transform domain, such as a frequency domain. The degree of quantization may be modified by adjusting a quantization parameter.

The transform/quantization unit 9143 may perform a scan of the matrix including the quantized transform coefficients. Alternatively, the entropy encoding unit 8148 may perform the scan.

The entropy encoding unit 9148 may receive a plurality of syntax elements from the prediction process unit 9141 and the transform/quantization unit 9143 including a quantization parameter, transform data, motion vectors, intra modes, partition information, and other syntax information. The entropy encoding unit 9148 may encode the syntax elements into the bitstream.

The entropy encoding unit 9148 may entropy encode the quantized transform coefficients by performing CAVLC, CABAC, SBAC, PIPE coding, or another entropy coding technique to generate an encoded bitstream. The encoded bitstream may be transmitted to another device (i.e., the second electronic device 120 in FIG. 1) or archived for later transmission or retrieval.

The inverse quantization/inverse transform unit 9144 may apply inverse quantization and inverse transformation to reconstruct the residual block in the pixel domain for later use as a reference block. The second summer 9145 may add the reconstructed residual block to the prediction block provided from the prediction process unit 9141 in order to produce a reconstructed block for storage in the decoded picture buffer 9147.

The filtering unit 9146 may include a deblocking filter, an SAO filter, a bilateral filter, and/or an ALF to remove blocking artifacts from the reconstructed block. Additional filters (in loop or post loop) may be used in addition to the deblocking filter, the SAO filter, the bilateral filter and the ALF. Such filters are not illustrated for brevity and may filter the output of the second summer 9145.

The decoded picture buffer 9147 may be a reference picture memory that stores the reference block for use by the encoder module 114 to encode video, such as in intra or inter coding modes. The decoded picture buffer 9147 may include a variety of memory devices such as DRAM (including SDRAM, MRAM, RRAM) or other types of memory devices. The decoded picture buffer 9147 may be on-chip with other components of the encoder module 114 or off-chip relative to those components.

The encoder module 114 may receive video data and use at least one intra prediction mode or at least one intra prediction method to predict a plurality of image frames in the video data. In some implementations, the video data may be a video and the at least one intra prediction mode or the at least one intra prediction method may be derived by the encoder module 114 or indicated by at least one flag and at least one index.

In some implementations, the encoder module 114 may perform intra prediction on a block unit (e.g., current block) to determine an intra prediction result of the block unit by using the intra prediction method 400, 600, 800 and 800' as illustrated in FIGS. 4, 6, 8A and 8B.

The encoder module 114 may further reconstruct the block unit based on the intra prediction result of the block unit.

The disclosed implementations are to be considered in all respects as illustrative and not restrictive. It should also be understood that the present disclosure is not limited to the specific disclosed implementations, and that many rearrangements, modifications, and substitutions are possible without departing from the scope of the present disclosure.

What is claimed is:

1. A method of decoding video data performed by an electronic device, the method comprising:
   receiving the video data;
   determining, from an image frame of the video data, a block unit;
   determining a first intra prediction of the block unit based on a decoder-side intra mode derivation (DIMD) mode, wherein determining the first intra prediction of the block unit based on the DIMD mode comprises:
      generating a histogram of gradient (HoG) list based on a first template region of the block unit, the HoG list comprising a plurality of angular modes associated with the block unit, wherein:
         a plurality of template angles and a plurality of template amplitudes corresponding to the plurality of template angles are calculated by applying a filter on each of a plurality of positions in the first template region, and
         each of the plurality of template angles corresponds to one of the plurality of angular modes;
   determining a second intra prediction of the block unit based on an intra prediction mode other than the DIMD mode;
   generating a third intra prediction based on the first intra prediction and the second intra prediction; and
   reconstructing the block unit based on the third intra prediction.

2. The method of claim 1, wherein the intra prediction mode other than the DIMD mode comprises at least one of a planar mode, a linear model mode, a direct current (DC) mode, or one of the plurality of angular modes different from the DIMD mode.

3. The method of claim 1, wherein the second intra prediction is determined based on a template-based intra mode derivation (TIMD) mode, and determining the second intra prediction of the block unit based on the TIMD mode comprises:
   determining a second template region associated with the block unit, the second template region comprising a first reconstructed block left-neighboring the block unit and a second reconstructed block upper-neighboring the block unit;
   calculating a plurality of template costs for a plurality of candidate modes of a candidate list respectively based on the second template region;
   selecting a first candidate mode of the plurality of candidate modes corresponding to a first minimum template cost of the plurality of template costs and a second candidate mode of the plurality of candidate modes corresponding to a second minimum template cost of the plurality of template costs, wherein the first minimum template cost comprises a least template cost in the plurality of template costs, and the second minimum template cost comprises a template cost that is greater than the first minimum template cost, but less than all other template costs in the plurality of template costs; and
   determining the second intra prediction based on the first candidate mode and the second candidate mode.

4. The method of claim 3, wherein calculating the plurality of template costs for the plurality of candidate modes of the candidate list respectively based on the second template region comprises:
   generating a plurality of predictions of the second template region based on a plurality of reference samples of the second template region, the plurality of predictions corresponding to the plurality of candidate modes of the candidate list; and
   calculating a plurality of template costs for the plurality of predictions based on a template reconstruction of the second template region, the plurality of template costs for the plurality of predictions corresponding to the plurality of template costs for the plurality of candidate modes of the candidate list.

5. The method of claim 3, wherein determining the second intra prediction based on the first candidate mode and the second candidate mode comprises:
   determining whether the second minimum template cost is less than twice the first minimum template cost;
   in a case that the second minimum template cost is less than twice the first minimum template cost, determining the second intra prediction based on the first candidate mode; and
   in a case that the second minimum template cost is not less than twice the first minimum template cost, determining the second intra prediction based on the first candidate mode, the second candidate mode, the first minimum template cost, and the second minimum template cost.

6. The method of claim 1, wherein determining the first intra prediction of the block unit based on the DIMD mode comprises:
   selecting at least one of the plurality of angular modes for determining the first intra prediction, wherein the first template region of the block unit comprises a first reconstructed region adjacent to a left side of the block unit, a second reconstructed region adjacent to an upper side of the block unit, and a third reconstructed region joining the first reconstructed region and the second reconstructed region.

7. The method of claim 6, wherein the at least one of the plurality of angular modes corresponds to at least one largest template amplitude within the plurality of template amplitudes.

8. The method of claim 1, wherein generating the third intra prediction based on the first intra prediction and the second intra prediction comprises:
   determining a first weight corresponding to the first intra prediction and a second weight corresponding to the second intra prediction; and
   generating the third intra prediction by calculating a weighted average of the first intra prediction and the second intra prediction based on the first weight and the second weight.

9. The method of claim 1, further comprising:
   decoding a specific flag in the video data, wherein the specific flag indicates whether to use the third intra prediction for reconstructing the block unit.

10. An electronic device for decoding video data, the electronic device comprising:
    one or more processors; and
    one or more non-transitory computer-readable media coupled to the one or more processors and storing one or more computer-executable instructions that, when executed by at least one of the one or more processors, cause the electronic device to:
       receive the video data;
       determine, from an image frame of the video data, a block unit;
       determine a first intra prediction of the block unit based on a decoder-side intra mode derivation (DIMD)

mode, wherein determining the first intra prediction of the block unit based on the DIMD mode comprises:
    generating a histogram of gradient (HoG) list based on a first template region of the block unit, the HoG list comprising a plurality of angular modes associated with the block unit, wherein:
        a plurality of template angles and a plurality of template amplitudes corresponding to the plurality of template angles are calculated by applying a filter on each of a plurality of positions in the first template region, and
        each of the plurality of template angles corresponds to one of the plurality of angular modes;
    determine a second intra prediction of the block unit based on an intra prediction mode other than the DIMD mode;
    generate a third intra prediction based on the first intra prediction and the second intra prediction; and
    reconstruct the block unit based on the third intra prediction.

11. The electronic device of claim 10, wherein the intra prediction mode other than the DIMD mode comprises at least one of a planar mode, a linear model mode, a direct current (DC) mode, or one of the plurality of angular modes different from the DIMD mode.

12. The electronic device of claim 10, wherein the second intra prediction is determined based on a template-based intra mode derivation (TIMD) mode, and determining the second intra prediction of the block unit based on the TIMD mode comprises:
    determining a second template region associated with the block unit, the second template region comprising a first reconstructed block left-neighboring the block unit and a second reconstructed block upper-neighboring the block unit;
    calculating a plurality of template costs for a plurality of candidate modes of a candidate list respectively based on the second template region;
    selecting a first candidate mode of the plurality of candidate modes corresponding to a first minimum template cost of the plurality of template costs and a second candidate mode of the plurality of candidate modes corresponding to a second minimum template cost of the plurality of template costs, wherein the first minimum template cost comprises a least template cost in the plurality of template costs, and the second minimum template cost comprises a template cost that is greater than the first minimum template cost, but less than all other template costs in the plurality of template costs; and
    determining the second intra prediction based on the first candidate mode and the second candidate mode.

13. The electronic device of claim 12, wherein calculating the plurality of template costs for the plurality of candidate modes of the candidate list respectively based on the second template region comprises:
    generating a plurality of predictions of the second template region based on a plurality of reference samples of the second template region, the plurality of predictions corresponding to the plurality of candidate modes of the candidate list; and
    calculating a plurality of template costs for the plurality of predictions based on a template reconstruction of the second template region, the plurality of template costs for the plurality of predictions corresponding to the plurality of template costs for the plurality of candidate modes of the candidate list.

14. The electronic device of claim 12, wherein determining the second intra prediction based on the first candidate mode and the second candidate mode comprises:
    determining whether the second minimum template cost is less than twice the first minimum template cost;
    in a case that the second minimum template cost is less than twice the first minimum template cost, determining the second intra prediction based on the first candidate mode; and
    in a case that the second minimum template cost is not less than twice the first minimum template cost, determining the second intra prediction based on the first candidate mode, the second candidate mode, the first minimum template cost, and the second minimum template cost.

15. The electronic device of claim 10, wherein determining the first intra prediction of the block unit based on the DIMD mode comprises:
    selecting at least one of the plurality of angular modes for determining the first intra prediction, wherein the first template region of the block unit comprises a first reconstructed region adjacent to a left side of the block unit, a second reconstructed region adjacent to an upper side of the block unit, and a third reconstructed region joining the first reconstructed region and the second reconstructed region.

16. The electronic device of claim 15, wherein the at least one of the plurality of angular modes corresponds to at least one largest template amplitude within the plurality of template amplitudes.

17. The electronic device of claim 10, wherein generating the third intra prediction based on the first intra prediction and the second intra prediction comprises:
    determining a first weight corresponding to the first intra prediction and a second weight corresponding to the second intra prediction; and
    generating the third intra prediction by calculating a weighted average of the first intra prediction and the second intra prediction based on the first weight and the second weight.

18. The electronic device of claim 10, wherein the one or more computer-executable instructions, when executed by the at least one of the one or more processors, further cause the electronic device to:
    decode a specific flag in the video data, wherein the specific flag indicates whether to use the third intra prediction for reconstructing the block unit.

* * * * *